July 26, 1955 R. C. STEWART ET AL 2,713,791
INSTRUMENT FOR MEASURING PHYSICAL CHARACTERISTICS OF SOIL
Filed Jan. 30, 1952

INVENTOR.
Richard C. Stewart
Stanley J. Weiss
BY
Attorneys

United States Patent Office 2,713,791
Patented July 26, 1955

2,713,791

INSTRUMENT FOR MEASURING PHYSICAL CHARACTERISTICS OF SOIL

Richard C. Stewart and Stanley J. Weiss, Oxnard, Calif.

Application January 30, 1952, Serial No. 269,101

10 Claims. (Cl. 73—101)

(Granted under Title 35, U. S. Code (1952), sec. 266)

The invention described herein may be manufactured and used by or for the Government of the United States of America for governmental purposes without the payment of any royalties thereon or therefor.

This invention relates to an instrument for measuring the physical characteristics of soils, and is particularly designed to determine in quantitative terms the coefficient of cohesion and the angle of internal friction of a given specimen of soil.

Knowledge of the physical characteristics of the soil of a given terrain is essential in determining the mobility of vehicles traversing such terrain, and is useful for other purposes. It is desirable that tests of physical characteristics be made on the undisturbed sample of soil in situ, since disturbed soil behaves differently than undisturbed soil, whatever steps may be taken in the laboratory to reproduce the conditions existing before the specimen was removed.

The instrument disclosed herein is intended for field use, and is of such simplicity that it may be of light weight, hence portable, while measuring certain soil characteristics with an accuracy not equaled by laboratory instruments, yet capable of exerting considerable force, to enable it to test to failure soil specimens having high viscosity or internal friction.

An object of the invention is to provide a portable instrument of the type indicated which is sturdy and reliable in use, and which will produce accurate and dependable results.

A further object is to provide an instrument whereby an undisturbed soil sample may be tested in situ.

A further object is to provide an instrument whereby an applied vertical load transmits controlled normal and shearing forces to the soil sample.

Other objects and many of the attendant advantages of this invention will be readily appreciated as the same becomes better understood by reference to the following description.

Figure 1:
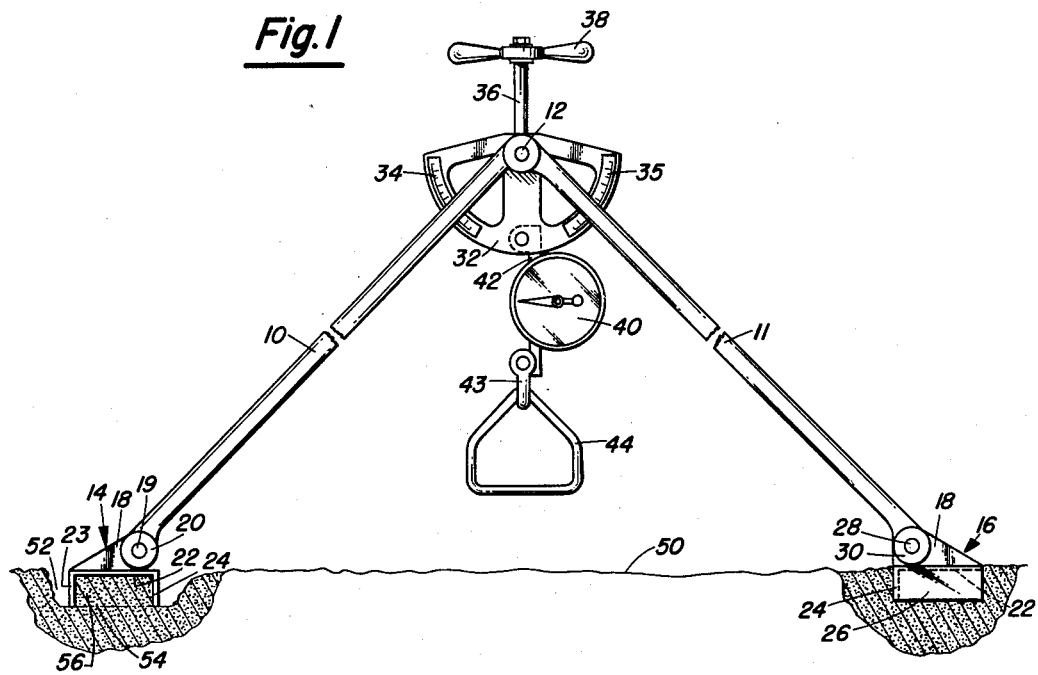
Figure 2:
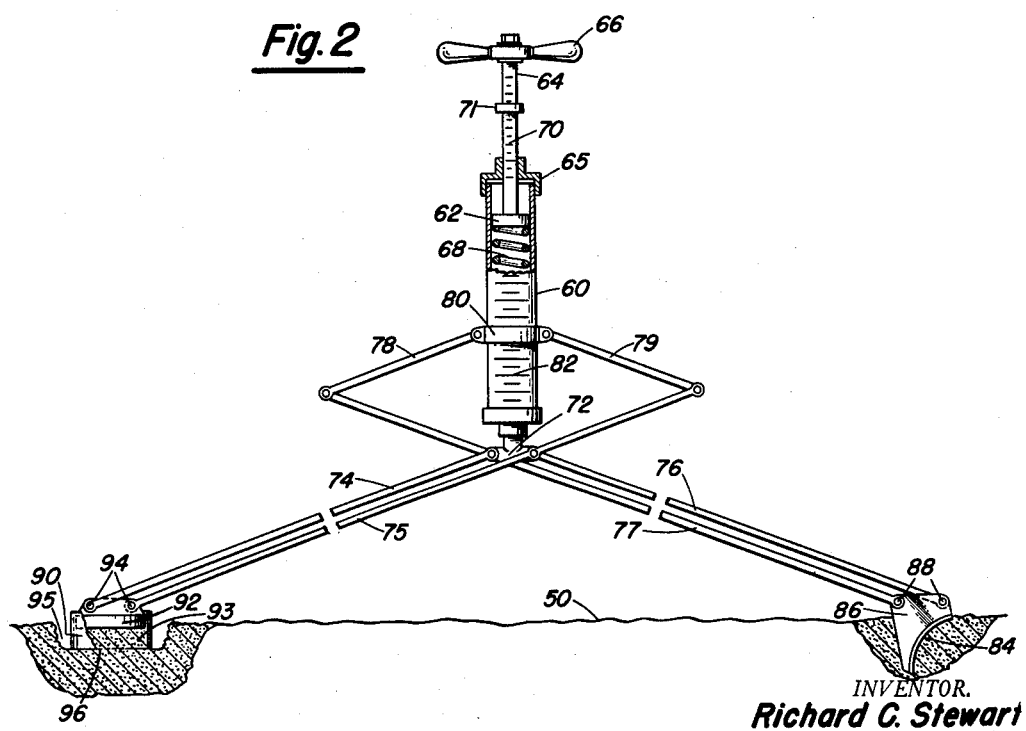

Fig. 1 is a view in side elevation of an instrument embodying the invention; and Fig. 2 is a view in side elevation, with parts broken away, showing a modified form of the invention.

The embodiment shown in Fig. 1 comprises two legs, 10 and 11, pivoted together at 12, and having pivoted to their lower ends respectively a shearing shoe or active shoe 14 and an anchor shoe 16. The shearing shoe comprises a vertical flange 18, pivoted at 19 to the bifurcated end 20 of leg 10, and a body having a horizontal plate 22 with transverse flanges 23, 24 forming substantially vertical walls designed to embrace the sample of soil to be tested. The anchor shoe is similar except for the omission of the outer flange 23 and the addition of side plates 26. It is pivoted at 28 to the bifurcated end 30 of leg 11.

A body in the form of a quadrant 32 is also pivoted to the assembly at 12, and carries protractor scales 34, 35 cooperating with the legs 10 and 11 to indicate the angle by which the legs diverge from the vertical. A shank 36 is fixed to the protractor, and carries a handle 38, by which the instrument may be lifted or manipulated.

A spring scale 40 is suspended from the quadrant 32 by a link 42, and the scale in turn supports, by means of a link 43, a stirrup 44, by means of which the operator may apply a portion or all of his weight to the instrument.

In the operation of the device shown in Fig. 1, the anchor shoe 16 is forced into a firm, solid portion of the soil until its horizontal plate 22 is flush with the surface at 50. The legs 10 and 11 are spread to a convenient angle, and the active shoe 14 is similarly inserted in the portion of the soil to be tested. The soil around the shoe 14 is then removed as indicated at 52, so that the shear strength along the plane 54 may be measured without interference from the surrounding soil. The angle on the protractor scale is read, and a gradually increasing downward force is applied to stirrup 44 until shearing takes place at 54, resulting in outward movement of shoe 14 with its entrapped column of soil 56 along plane 54. From several tests on different specimens at varying leg angles, average values are used involving Coulomb's equation for soil:

$$S_p = S_n \tan \phi + C$$

where $S_p$ is the shearing stress of the sample in pounds per square inch, $S_n$ is the normal (vertical) load on the sample in pounds per square inch, $\phi$ is the angle of internal friction in degrees, and C is the coefficient of cohesion in pounds per square inch.

The form of the invention shown in Fig. 2 comprises a body including a cylinder 60 in which is mounted a piston 62 on a piston rod 64. Piston rod 64 is slidable in a collet 65 secured to the upper end of cylinder 60. A cross bar or handle 66 at the upper end of piston rod 64 constitutes a means for manually applying pressure to piston 62, which is urged upwardly by a compression spring 68 in cylinder 60. The piston rod 64 carries a scale 70, and a collar 71 is slidable over this scale, being so frictionally related to the rod that it will remain in any position to which it is moved. When handle 66 is to be depressed in the testing of a soil sample, collar 71 is first slid downwardly into contact with collet 65. Subsequent depression of the handle moves the collar upwardly relative to rod 64, where it remains in place to indicate the greatest force, in pounds, applied in shearing the soil sample.

An adapter 72 is fitted to the lower end of cylinder 60, and has pivoted thereto two legs formed of parallel bars 74, 75, 76, 77, the even numbered bars terminating at the adapter, while the odd numbered bars extend therebeyond, and are pivotally connected to links 78, 79. The links are in turn pivotally connected to a sleeve 80 slidable on the exterior of cylinder 60, its position being readable with reference to a scale 82 on the cylinder, preferably calibrated to indicate in degrees the angle between the two legs, or the angle by which they diverge from the vertical.

The anchor shoe is in this case formed with a curved blade 84 supported by spaced parallel plates 86 and designed to be pushed into the soil in the manner of a spade. Bars 76 and 77 are pivoted to the plates 86 by horizontally spaced pivot pins 88.

The active shoe comprises a hollow, open ended member which may be in the form of a cylinder 90 designed to be driven into the soil to enclose the column of soil 93 to be tested. Slidable within the cylinder 90 is a plunger 92 designed to transmit horizontal force to the member 90 without transmitting vertical force thereto. The plunger 92 is connected to the bars 74 and 75 by pivot pins 94. It will be seen that, at whatever angle the legs may be to the vertical, the plunger 92 and the plates 86 will remain in upright positions, since the bars and links transmit motion in lazy-tongs fashion.

The operation of the device shown in Fig. 2 is similar to that of the form shown in Fig. 1, with certain differences to be noted. The anchor shoe being inserted into firm soil as shown, the member 90 is driven into the ground to surround the sample 93 to be tested. The distance between the two shoes is so selected that the legs 74, 75 and 76, 77 will be spread to a convenient angle. The plunger 92 is inserted into the member 90 as shown, and the soil around it is removed as indicated at 95, so that the shear strength of the column 93 along the plane 96 may be measured. The angle on the scale 80 is read, and a gradually increasing downward force is applied to cross bars 66 until shearing at 96 takes place, resulting in outward movement of the active shoe with its entrapped column of soil 93. The procedure is repeated and the average of the values obtained are utilized in the formula given above, to calculate shear strength, angle of internal friction, and coefficient of cohesion in the sample.

Advantages of the form of the invention shown in Fig. 2 are: the fact that the column of soil is enclosed on all sides minimizes error due to variation of the cross-sectional area during failure; the separation of the active shoe into cylinder and plunger places the entire vertical load transmitted through the leg 74, 75 upon the sample being tested, rather than having a portion of it borne by the plates 23, 24 of Fig. 1; the lazy-tongs construction of the legs neutralizes the tendency of the shoes to tilt outwardly; the spring-loaded cylinder 60 is more compact than the protractor and scale arrangement of Fig. 1.

It will be understood that by use of a suitable chart, it is possible to solve the above equation graphically from the data obtained by the instrument, without use of calculations.

Obviously many modifications and variations of the present invention are possible in the light of the above teachings. It is therefore to be understood that within the scope of the appended claims the invention may be practiced otherwise than as specifically described.

What is claimed is:

1. An instrument for determining physical characteristics of soil, comprising a pair of inclined legs pivotally connected to each other and each having at its free end a soil engaging shoe, means for indicating the angle which the legs make with the vertical, means for applying a vertical force to said legs substantially at the pivotal connection of said legs, and means for indicating said force.

2. An instrument for determining physical characteristics of soil, comprising a body, a pair of legs pivotally connected to said body, means for applying a vertical force to said legs, means for measuring the magnitude of said force, an anchor shoe connected to the lower end of one of said legs, and an active shoe pivotally connected to the lower end of the other leg, said active shoe comprising a hollow member designed to be driven into the soil to surround a sample of soil to be tested, and a plunger vertically slidable in said hollow member.

3. The invention defined in claim 2, wherein each of said legs comprises a pair of parallel rods pivotally connected to the body and to its shoe and operating in lazy-tongs fashion to maintain the shoe in horizontal position despite variation in the angle by which the legs diverge from the vertical.

4. An instrument for determining physical characteristics of soil, comprising a body, a pair of legs pivotally connected to said body, means for applying a vertical force to said legs, means for measuring the magnitude of said force, an anchor shoe connected to the lower end of one of said legs, and an active shoe connected to the lower end of the other leg, said active shoe comprising a hollow open-ended member designed to be driven into the soil to surround a column of soil to be tested, and a plunger slidable in said member.

5. The invention defined in claim 4, wherein each of said legs comprises a pair of rods each pivotally connected to the body, a collar slidable on said body, links pivotally connecting one rod of each leg to said collar, and a scale on said body indicating the angle between said legs in accordance with the position of said collar.

6. An instrument for determining physical characteristics of soil, comprising a pair of legs pivotally connected to each other, means for applying a vertical force to said legs, means for measuring the magnitude of said force, an anchor shoe connected to the lower end of one of said legs, an active shoe including substantially vertical walls shaped to enclose a column of soil of predetermined cross-sectional area, and a plunger connected to the lower end of the other leg and vertically slidable within said walls.

7. An instrument for testing soil, comprising a pair of legs having a pivotal connection with each other and inclined downwardly and outwardly from said pivoted connection, an anchor shoe at the lower end of one of said legs, an active shoe having generally vertical spaced surfaces constructed and arranged to define a column of undisturbed soil of predetermined cross-sectional area, a plunger connected to the lower end of the other leg and vertically slidable between said surfaces, means for applying a downward force to said legs between said shoes to thereby exert a horizontal force on said plunger, and means for measuring the magnitude of said force.

8. An instrument for testing shear strength of soil in situ, comprising a pair of legs having a pivotal connection with each other and inclined downwardly and outwardly from said pivotal connection, an anchor shoe at the lower end of one of said legs, an active shoe at the lower end of the other of said legs and having generally vertical horizontally spaced surfaces designed to delimit a column of soil therebetween, means connected to said legs for applying a downward force to said legs intermediate said shoes, means for indicating the magnitude of said force, and means for indicating the angle between each of said legs and the vertical.

9. A process of determining a physical characteristic of soil, comprising confining in situ a column of soil of predetermined cross-sectional area, removing the soil adjacent said column, applying to said column an increasing downwardly and laterally directed force until horizontal shearing of the column occurs, and determining the horizontal component of said force.

10. A process of determining a physical characteristic of soil, comprising isolating and confining in situ a column of soil of predetermined cross-section, applying to said column a downwardly and laterally directed force to cause horizontal shearing of said column, and determining the magnitude and direction of said force.

References Cited in the file of this patent

FOREIGN PATENTS

| 286,480 | Great Britain | Mar. 8, 1928 |
| 704,684 | Germany | Apr. 4, 1941 |
| 967,248 | France | Mar. 22, 1950 |